Aug. 9, 1966 G. K. C. HARDESTY 3,264,769
ILLUMINATED FIXED INDICIA INDICATING DEVICE
Filed Dec. 7, 1960 4 Sheets-Sheet 1

INVENTOR.
G. K. C. HARDESTY
BY
Howard W. Hermann
AGENT.

Aug. 9, 1966  G. K. C. HARDESTY  3,264,769
ILLUMINATED FIXED INDICIA INDICATING DEVICE
Filed Dec. 7, 1960  4 Sheets-Sheet 2

INVENTOR.
G. K. C. HARDESTY
BY

AGENT.

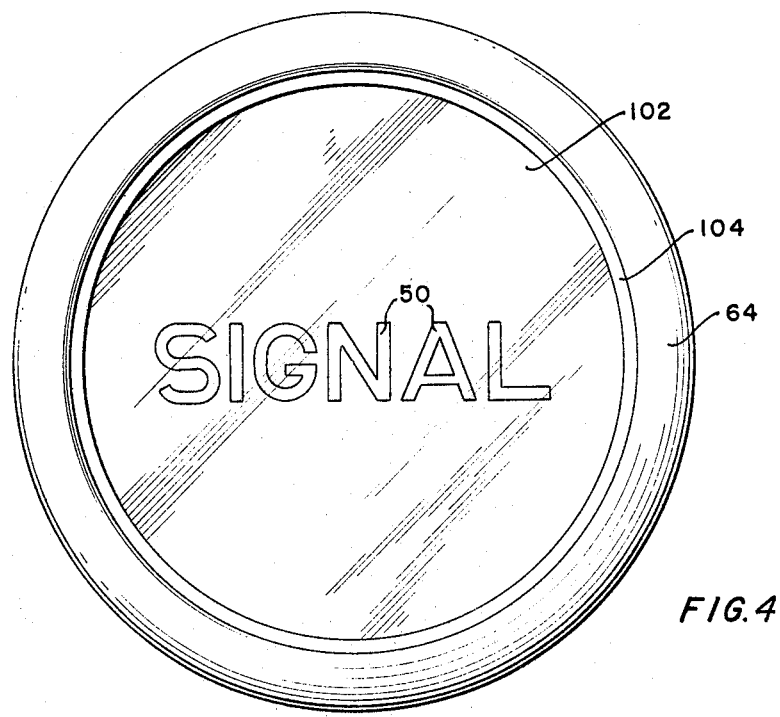
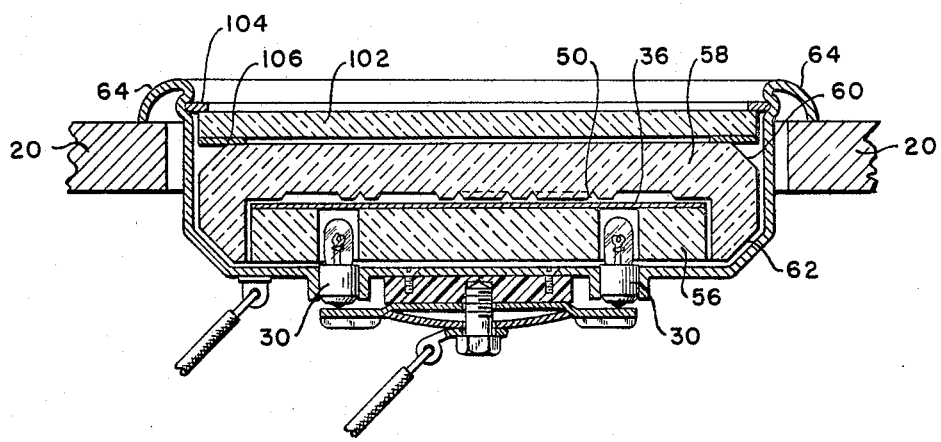

Aug. 9, 1966   G. K. C. HARDESTY   3,264,769
ILLUMINATED FIXED INDICIA INDICATING DEVICE
Filed Dec. 7, 1960   4 Sheets-Sheet 4
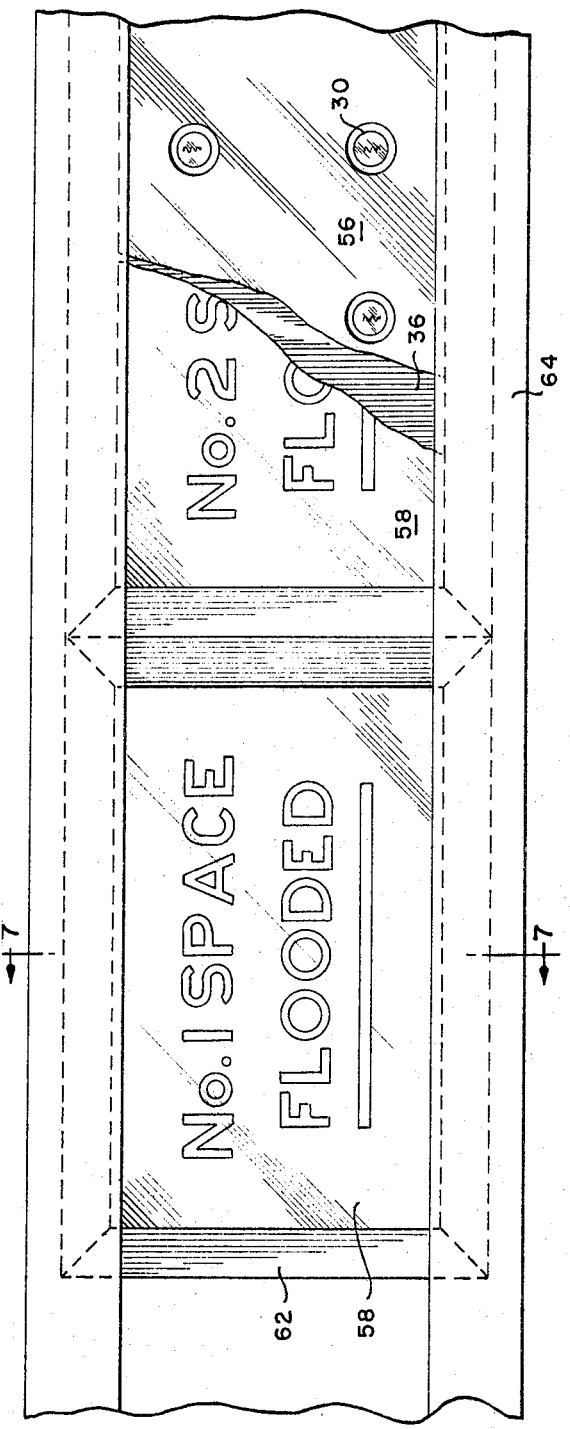
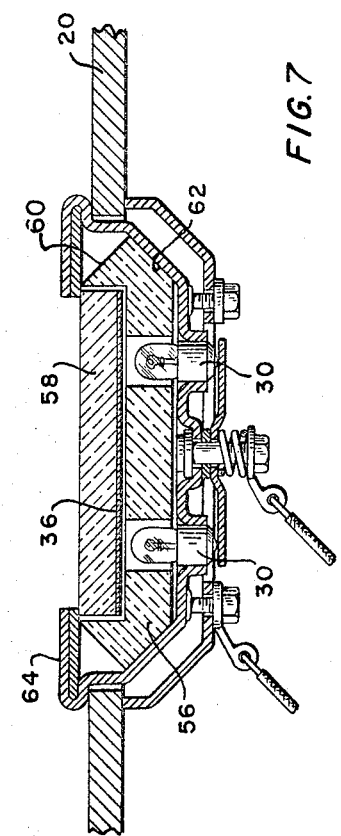
INVENTOR.
G. K. C. HARDESTY
BY Howard W. Hermann
AGENT.

United States Patent Office 3,264,769
Patented August 9, 1966

3,264,769
ILLUMINATED FIXED INDICIA INDICATING DEVICE
George K. C. Hardesty, Box 156, Mayo, Md.
Filed Dec. 7, 1960, Ser. No. 74,438
1 Claim. (Cl. 40—130)

The invention described herein may be manufactured and used by or for the Government of the United States of America for governmental purposes without the payment of any royalties thereon or therefor.

The present invention relates to panel illumination and more particularly to the illumination of control console indicators under conditions running from near or total darkness to high ambient illumination.

Many critical equipment failures or other emergency conditions can result from the complexities of modern aircraft, shipboard, and missile control equipment. To protect the ship or aircraft or missile and the personnel who must work around it continuous monitoring and alarm systems have been progressively developed. Several types of these monitoring and alarm systems employ audible signals to attract attention of personnel but in some instances there is difficulty in providing distinctively different audible signals for each of the monitors. In other instances, as in the submarine, audible signals must be silent for long periods and reliance placed on silent warning signals. Available visual signals however, do not cover the necessary range of application needs. There is little available to the ship or aircraft designer between the "pilot" or "indicator light" and the large rotating flashing signals of the familiar police squad car or ambulance. Conspicuous, attention demanding, legend displays, which are compact and inexpensive, are needed to provide many shipboard and shore installations with adequate monitor warning signal systems.

Many types of indicator lights and panel illumination devices have been suggested for use on control consoles. The failure of many existing indicator displays to be discernible in high ambient illumination has been the cause of much concern in both shipboard and aircraft situations. When a number of conventional indicator lights are grouped together, the total array is too bright for comfort for near-dark adaptation viewing. Further, the full significance of the light being energized is often a matter of training and memory because it has not been possible heretofore to read the legends on nearby nameplates with prevalent ambient illumination. Some dim-out cap assemblies utilize back-lighted, stencilled, legend discs but their use entails a sharp reduction of maximum brightness that depreciates the effectiveness of the signal, particularly in the higher ambient illumination now prevalent in new submarine construction. Translucent signal panels have in the past been rear illuminated by lamps placed behind the panel. However, such attempts at rear illumination invariably have resulted in uneven ineffective illumination if the lamps are placed close to the rear panels, or vastly reduced brightness if the lamps are sufficiently removed from the panels to result in reasonably uniform brightness. It should also be noted that in some instances, sufficient space is not available behind the console panel for removal of these lamps in case of lamp failure.

The present invention permits efficient, presentation of displays which are particularly suitable for use in high ambient illumination conditions. The underlying optical system is capable of use with various types of illumination sources with greater efficiency in both power and space than was possible with most prior art devices. The illumination provided by this invention achieves uniform high brightness displays that are suitable for use in control and monitoring applications where the uneven, ineffective, displays which were prevalent in many prior art devices are virtually useless. These advantages are provided basically by a closed-loop or reentrant optical circuit wherein the light source is shielded form the indicia to be illuminated by an opaque barrier. In accordance with the invention, light from the light source is carried around the opaque shield, in accordance with the laws of total internal reflection, by a transparent light transmitting element.

Accordingly, it is an object of the present invention to provide an improved illuminated signal device adequate for use under conditions of high ambient illumination as well as under conditions of near or total darkness.

Another object is the provision of a system for effecting local zones of rear illumination in translucent signal panels with the result that uniform brightness symbols on the panels may be selectively illuminated in accordance with the needs of a monitoring or control equipment.

A further object of the invention is to provide, a small illuminated-legend, indicating module capable of presenting information without the need for auxiliary name plate interpretation.

Still another object is the provision of a legend display which will be conspicuous, attention demanding, compact, inexpensive, and optionally capable of presenting the displayed information in a series of coded colors.

Other objects and many of the attendant advantages of this invention will be readily appreciated as the same becomes better understood by reference to the following detailed description when considered in connection with the accompanying drawings wherein:

FIG. 4 is a front view of still another embodiment utilizing the principle of FIG. 1;

FIG. 5 is a sectional view of the embodiment shown in FIG. 4;

FIG. 6 is a front view of a strip type indicator utilizing the principles illustrated in FIG. 1;

FIG. 7 is a cross sectional view of the embodiment shown in FIG. 6; and

Figure 1:
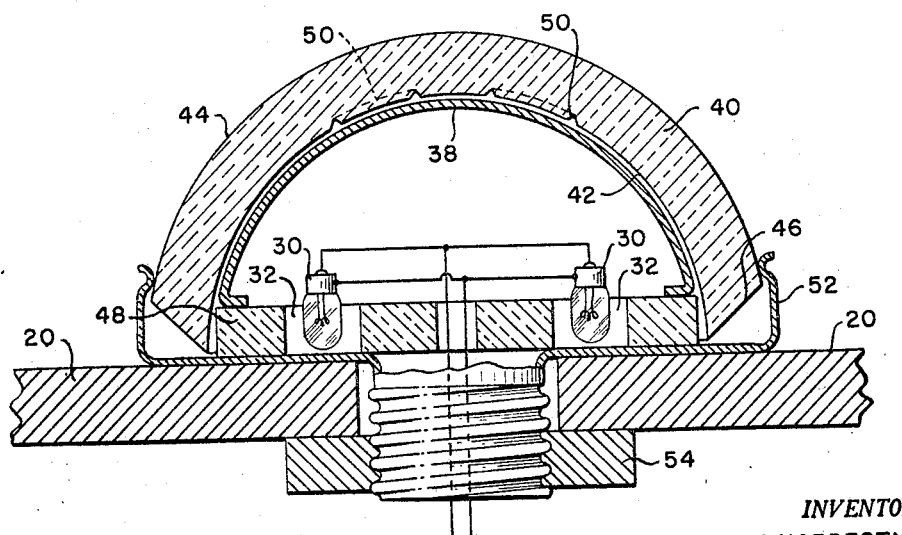
FIG. 1 is a sectional view of an embodiment illustrating the generic concept of the present invention.

Referring now to the drawings wherein like reference numerals designate like or corresponding parts throughout the several views, there is shown in FIG. 1 an embodiment of the invention comprising a transparent light conducting hemisphere 40 having light reflective inner surface 42, light reflective outer surface 44 and a beveled edge 46 which is designed to cooperate with a transparent light conducting disc 48. A pair of lamps 30 are provided in a pair of apertures 32 in disc 48. An opaque light shield 38 is interposed between lamps 30 and the viewable surface of hemisphere 40. A plurality of engraved illuminable indicia 50 are provided on the inner surface of hemisphere 40. The assembly is held together by a mounting device 52 which is designed to extend through console panel 20 and be secured by a nut 54 at the back thereof. It will be seen that light emanating from sources 30 will be conducted by means of disc 48 and reflected from the beveled edge 46 to the interior of hemisphere 40, where according to the laws of internal reflection the light will again be recirculated through disc 48 and hemisphere 44.

It will be realized that in place of individual lamps 30 a flourescent tube may be provided as a source of illumination and rather than a hemispherical member 44, the member 44 may be semi-cylindrical in shape thereby providing illumination for an elongated panel. Again, the element 44 may be of colored transparent material if desired and the illuminable indicia 50 may be coated with a light diffusing material.

Figure 2:
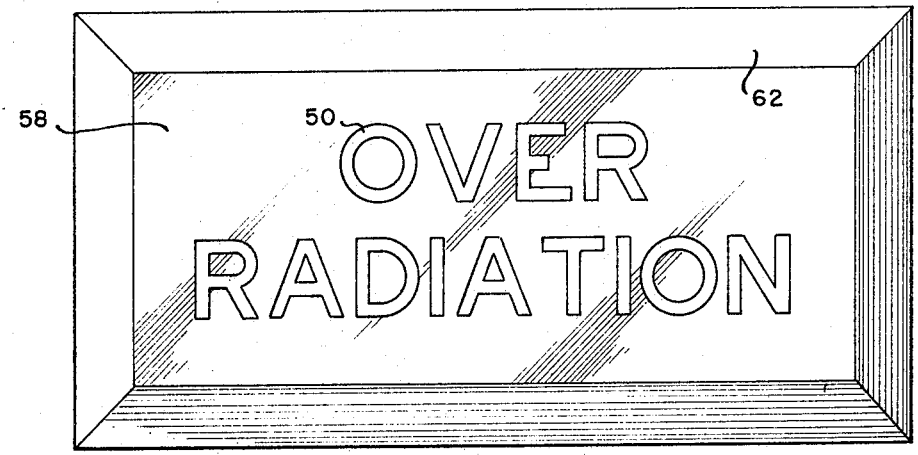
FIG. 2 is a front view of a flat plate indicator made in accordance with the principle of FIG. 1.
Figure 3:
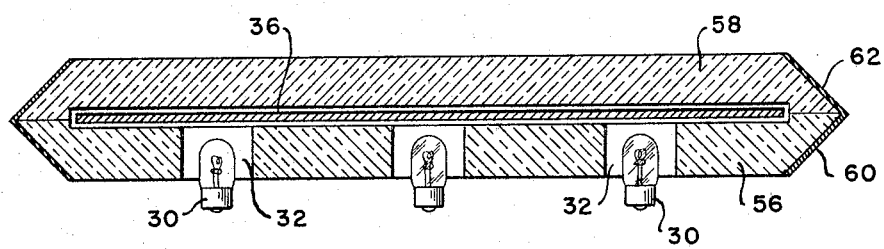
FIG. 3 is a sectional view of the indicator of FIG. 2.

Referring now to FIGS. 2 and 3 there is shown a rectangular form of signal panel which has been applied to shipboard radiation alarm equipment. In this embodiment the optical circuit consists of a light input element 56 which is peripherally coupled to a light conducting, edge-lighted display element 58. Elements 56 and 58 have beveled edges 60 and 62 respectively, which are shown as mirrored but which may be merely polished surfaces. Light input or receiving element 56 has drilled therein a plurality of aperatures 32 in which are mounted a plurality of light sources 30. Again a plurality of engraved or painted light diffusing indicia 50 are provided on a surface of edgelighted display element 58, and an opaque light barrier is interposed between light sources 30 and edgelighted display element 58.

It will be seen that this type of structure eliminates the large amount of space required behind the indicia panel in backlighted prior art devices. Light from sources 30 is carried between the parallel reflecting faces of light input element 56, reflected between mirrored beveled surfaces 60 and 62 and thence carried by edge lighting to indicia 50. Any light not reflected to the observer by indicia 50 reenters light input element 56 and is again transmitted through the circuit.

FIGS. 4 and 5 show a disc shaped display element. The symbols 50 to be displayed are carried by a double prismatic display element 58 which receives light flux into its double prismatic peripheral portions 60, 62 from light input element 56 which in turn receives light from sources 30. Again, an opaque barrier 36 is interposed between sources 30 and display element 58. An enclosing housing and light shield 64 is again utilized to hold the assembly in place and mount it on a console panel 20. If desired a colored filter 102, which may be any desired color, may be held into the assembly by a retaining ring 104. A masking ring or gasket 106 is mounted either in front of or behind the filter 102 to prevent a viewer from seeing a refracted image of the filaments of light sources 30.

In this embodiment it will be seen that light emitted from sources 30 is transmitted between reflective surfaces of light input element 56, thence to the double prismatic peripheral zone of edge lighted display element 58 to thereby illuminate the indicia 50. It will be realized that in the absence of the provision of the masking ring such as 106, FIG. 5, a portion of the light reflected from edge 62 of element 58 will be reflected out of the element 58 at the periphery thereof. Thus, if an alarm type signal which is to be extremely eye-catching is desired, element 106 can be eliminated from the device; however it will be realized that the glare emitted from the reflected lamp images at the periphery of the device may at times prove too strenuous on the eyes of the viewer.

FIGS. 6 and 7 show a module for a single or multiple assembly which is quite similar to the circular form shown in FIGS. 4 and 5. As shown in FIG. 7 the light input element 56 has the double prismatic periphery including beveled edges 60 and 62 for reflecting light from sources 30 into the edge lighted display element 58 which again is shielded from lamps 30 by an opaque light barrier 36. The assembly is mounted in an oblong housing element 64 which also acts as a light shield to prevent undesirable rays from leaving the assembly. As shown in FIG. 6 these assemblies may be mounted in multiple sections using a single housing 64.

Figure 8:
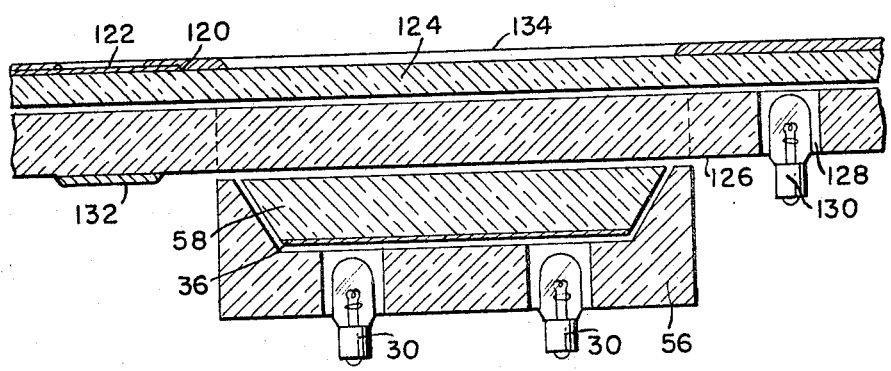
FIG. 8 is a cross sectional view of an indicator device utilizing the principles of the embodiment shown in FIG. 1 in addition to a duo-panel principle of construction.

FIG. 8 of the present invention utilizes a duo-panel in which the reflux module provides a means for an auxiliary signaling function. In this embodiment an opaque background 120, which is provided around translucent light indicia 122, is mounted upon indicia panel 124 of the duo-panel. The light conducting panel 126 of the duo-panel has an aperture 128 therein in which is mounted a lamp 130 which is designed to transmit light through the light conducting panel and reflect it from light reflector 132 to illuminate the indicia. Mounted behind opening 134 in the opaque background 120 of the duo-panel is an auxiliary reflux element composed of a light input element 56 in which are mounted sources 30 which are designed to coact with an energy exit element 58, a counterpart of the edge lighted display elements in the other embodiments described above. Interposed between lamps 30 and energy exit element 58 is an opaque light barrier 36 having a partial or a complete coating on the upper face thereof and which coating is in optical contact with a surface of element 58 and therefore is illuminated from the reentrant light circuit made up of sources 30, light input element 56 and energy exit element 58. The duo-panel in this case may serve merely as a window for viewing a symbol or legend element that may be interposed between barrier 36 and element 58 of the auxiliary reflux signal module or the window may be in the form of a symbol or legend to be illuminated by the module. A plurality of auxiliary modules which may be selectively energized may be provided behind the duo-panel or alternatively may be received in a recess in the light conducting panel of the duo-panel providing that opaque barriers are provided to prevent the unwanted transfer of light from the light conducting panel to the reflux module and the consequent ambiguity of signalling. Such barriers may be in the form of a painted coating on the modules or on the walls of the recess or opening in the light conducting panel.

Obviously many other modifications and variations of the present invention are possible in the light of the above teachings. It is therefore to be understood that within the scope of the appended claim the invention may be practiced otherwise than as specifically described.

What is claimed is:

An edge lighted indicator illumination system comprising:

a circular flat light conducting panel having at least one aperture therein;

a light source mounted in said aperture;

a hollow hemispherical light conducting body having its edge located in close proximity to the edges of said circular panel;

the edge of said hemispherical light conducting body being prismatically polished and beveled at an angle to the radius of the hemisphere and to the plane of said panel, for directing light rays by total internal reflection from said source via said edge through said hemisphere;

a hemispherical opaque body of material underlying substantially the entire inner surface of said hemisphere;

and a plurality of indentations forming intelligible indicia located on the inner surface of said hemisphere for intercepting and reflecting therefrom a portion of the light rays otherwise totally internally reflected thru the hemisphere.

References Cited by the Examiner

UNITED STATES PATENTS

| | | | |
|---|---|---|---|
| 2,088,860 | 8/1937 | Kellogg | 40—130 X |
| 2,287,605 | 6/1942 | Dickson et al. | 240—1 |
| 2,365,864 | 12/1944 | Chapman | 240—2.17 |
| 2,561,881 | 7/1951 | Oetting | 40—130 |
| 2,561,885 | 7/1951 | Prideaux et al. | 40—130 |
| 2,805,505 | 9/1957 | Hardesty | 40—130 |
| 2,886,911 | 5/1959 | Hardesty | 40—130 |
| 2,906,048 | 9/1959 | Kraus | 40—130 |
| 2,916,011 | 12/1959 | Molis | 240—1 |
| 2,953,668 | 9/1960 | Bassett | 240—1 |
| 2,988,631 | 7/1961 | Hershey | 240—2.17 X |

(Other references on following page)

FOREIGN PATENTS

| | | |
|---|---|---|
| 816,795 | 5/1937 | France. |
| 1,047,713 | 7/1953 | France. |
| 402,825 | 1933 | Great Britain. |
| 534,695 | 3/1941 | Great Britain. |
| 621,504 | 4/1949 | Great Britain. |

WALTER A. SCHEEL, *Primary Examiner.*

LEWIS J. LENNY, *Examiner.*

E. V. BENHAM, R. E. PULFREY, JEROME SCHNALL, L. W. VARNER, HERBERT F. ROSS, CLYDE I. COUGHENOUR, *Assistant Examiners.*